(12) United States Patent
Zheng et al.

(10) Patent No.: US 7,440,270 B2
(45) Date of Patent: Oct. 21, 2008

(54) MOUNTING APPARATUS FOR DATA STORAGE DEVICES

(75) Inventors: Ji-Wei Zheng, Shenzhen (CN); Wei Zhang, Shenzhen (CN); Qin Guo, Shenzhen (CN); Guang-Yao Lee, Taipei Hsien (TW); Chun-Chi Liang, Taipei Hsien (TW)

(73) Assignees: Hong Fu Jin Precision Industry (ShenZhen) Co., Ltd., ShenZhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 66 days.

(21) Appl. No.: 11/563,157

(22) Filed: Nov. 25, 2006

(65) Prior Publication Data
US 2007/0279860 A1 Dec. 6, 2007

(30) Foreign Application Priority Data
Jun. 2, 2006 (CN) .................... 2006 2 0014149 U

(51) Int. Cl.
*G06F 1/16* (2006.01)
(52) U.S. Cl. .................... 361/685; 248/58; 360/97.01; 206/307.1

(58) Field of Classification Search ................. 312/215, 312/223.2; 360/254.8, 255, 97.01, 265.6; 248/58, 27.5; 206/310, 307.1; 361/679–687, 361/724–727
See application file for complete search history.

(56) References Cited

U.S. PATENT DOCUMENTS

| 5,332,306 A | 7/1994 | Babb et al. |
| 6,731,508 B2 * | 5/2004 | Chen .......................... 361/727 |
| 2007/0145866 A1 * | 6/2007 | Huang et al. ................. 312/215 |
| 2007/0235625 A1 * | 10/2007 | Liang et al. ................. 248/675 |

* cited by examiner

*Primary Examiner*—Hung V Duong
(74) *Attorney, Agent, or Firm*—Wei Te Chung

(57) ABSTRACT

A mounting apparatus for mounting a data storage device that defines a locking hole in a sidewall thereof, includes a bracket for holding the data storage device, a first locking member, and a second locking member. The bracket includes a side wall. The side wall defines a through-hole therein. The first locking member is pivotably mounted to the side wall of the bracket. A locking portion protrudes from the first locking member for being inserted through the through-hole of the bracket to engage in the locking hole of the data storage device. The second locking member is pivotably mounted to the side wall of the bracket, and releasably mounted to the first locking member.

20 Claims, 5 Drawing Sheets

MOUNTING APPARATUS FOR DATA STORAGE DEVICES

BACKGROUND OF THE INVENTION

1. Field of the Invention

The present invention relates to mounting apparatuses, and particularly to a mounting apparatus which readily allows securely installing or removing a data storage device to or from a computer enclosure.

2. Description of Related Art

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

Conventionally, a data storage device is attached to a drive bracket of a computer by bolts. The data storage device may, for example, be a hard disk drive, a floppy disk drive, or a CD-ROM drive. However, attachment by bolts is complicated and time-consuming. Furthermore, attachment by such means requires extra work space be available inside the computer enclosure. This requirement runs counter to the trend toward miniaturization in the computer industry.

To overcome the above problems, rails have been developed to mount a data storage device to a computer enclosure. Such rails are disclosed in Taiwan Patent Application No. 82202204 and a U.S. Pat. No. 5,332,306. Two such rails are attached to respective opposite sides of a data storage device. This assembly is then slidably inserted into the computer enclosure. However, the rails may easily fall off when installing or uninstalling the data storage device.

What is desired, therefore, is a mounting apparatus which readily allows securely installing or removing a data storage device to or from a computer enclosure.

SUMMARY OF THE INVENTION

An exemplary mounting apparatus for mounting a data storage device that defines a locking hole in a sidewall thereof, includes a bracket for holding the data storage device, a first locking member, and a second locking member. The bracket includes a side wall. The side wall defines a through-hole therein. The first locking member is pivotably mounted to the side wall of the bracket. A locking portion protrudes from the first locking member for being inserted through the through-hole of the bracket to engage in the locking hole of the data storage device. The second locking member is pivotably mounted to the side wall of the bracket, and releasably mounted to the first locking member.

Other advantages and novel features will become more apparent from the following detailed description when taken in conjunction with the accompanying drawings, in which:

DETAILED DESCRIPTION OF THE INVENTION

Figure 1:
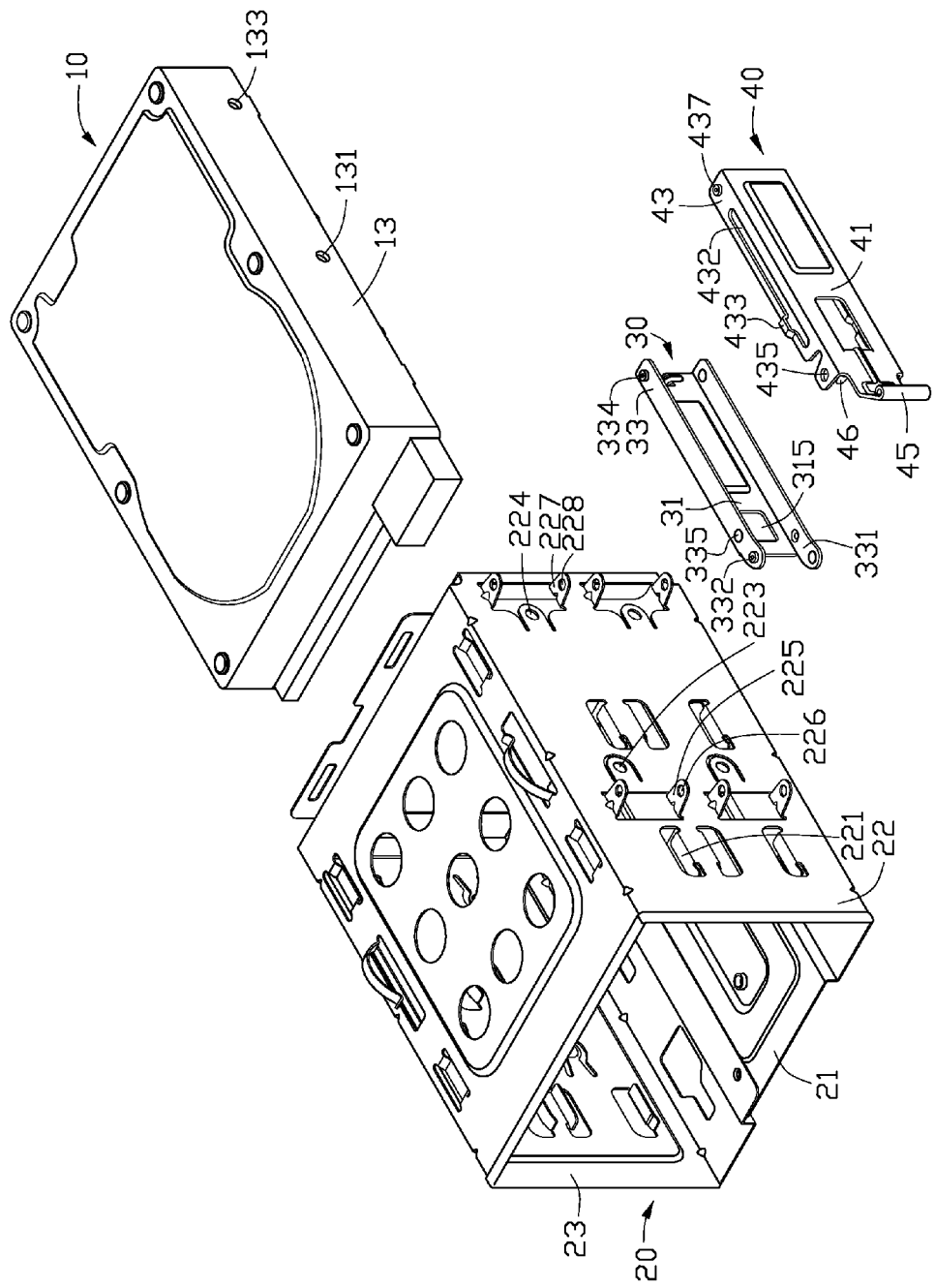
FIG. 1 is an exploded, isometric view of a mounting apparatus for a data storage device in accordance with a preferred embodiment of the present invention, together with a data storage device, the mounting apparatus includes a bracket, a first locking member, and a second locking member.

Referring to FIG. 1, a mounting apparatus of an electronic device such as a computer in accordance with a preferred embodiment of the present invention is shown for mounting a functional component such as a data storage device 10 to an enclosure of the computer. The data storage device 10 defines a first locking hole 133, and a second hole 131 in a sidewall 13 thereof. The mounting apparatus includes a bracket 20, a first locking member 30, and a second locking member 40.

The bracket 20 includes a bottom wall 21, a first side wall 22 extending up from a side of the bottom wall 21, and a second side wall 23 extending up from an opposite side of the bottom wall 21. A pair of limiting tabs 231 parallel to the bottom wall 21 extends in from each of the first and second side walls 22, 23. A pair of first mounting tabs 225 is perpendicularly bent from an end of the first side wall 22. Each first mounting tab 225 defines a first mounting hole 226. A pair of second mounting tabs 227 is perpendicularly bent from an opposite end of the first side wall 22. Each second mounting tab 227 defines a second mounting hole 228. A first through-hole 224 adjacent the second mounting tabs 227, and a second through-hole 223 adjacent the first mounting tabs 225 are defined in the first side wall 22.

Figure 2:
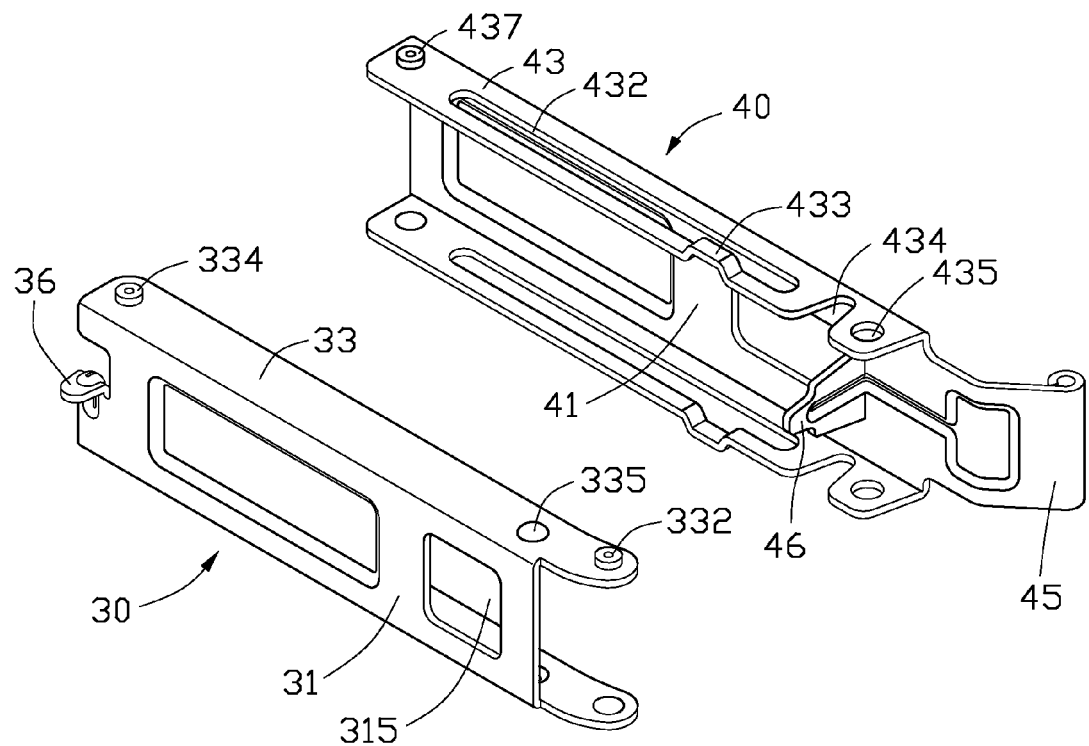
FIG. 2 is an exploded, isometric view of the first locking member and the second locking member of FIG. 1, but viewed from another aspect.

Referring also to FIG. 2, the first locking member 30 includes a main plate 31, two side plates 33 respectively perpendicularly extending from a top and a bottom side of the main plate 31. An opening 315 is defined in an end of the main plate 31. A first locking portion 36 perpendicularly extends out from an opposite end of the main plate 31. A sliding portion 334 protrudes out from an end of each side plate 33 adjacent the first locking portion 36. A protrusion 335 protrudes out from an opposite end of each side plate 33 adjacent the opening 315. An extension tab 331 horizontally extends out from an end adjacent the protrusion 335 of each side plate 33. A first post 332 extends out from each extension tab 331.

The second locking member 40 includes a main board 41, and a pair of side boards 43 respectively perpendicularly extending from a top and a bottom side of the main board 41. A second locking portion 46 perpendicularly extends out from the main board 41, corresponding to the opening 315 of the first locking member 30. An arc-shaped operating portion 45 is bent out from the main board 41 adjacent the second locking portion 46. A second post 437 protrudes out from an end of each side board 43 opposite to the second locking portion 46. A locating hole 435 is defined in an opposite side of each side board 43 adjacent the second locking portion 46. A sliding slot 432 is defined in each side board 43 between the corresponding second post 437 and the corresponding locating hole 435. A bridge-shaped tab 433 is bent out from each side board 43, with an entry to the corresponding sliding slot 432 being defined thereunder.

Figure 3:
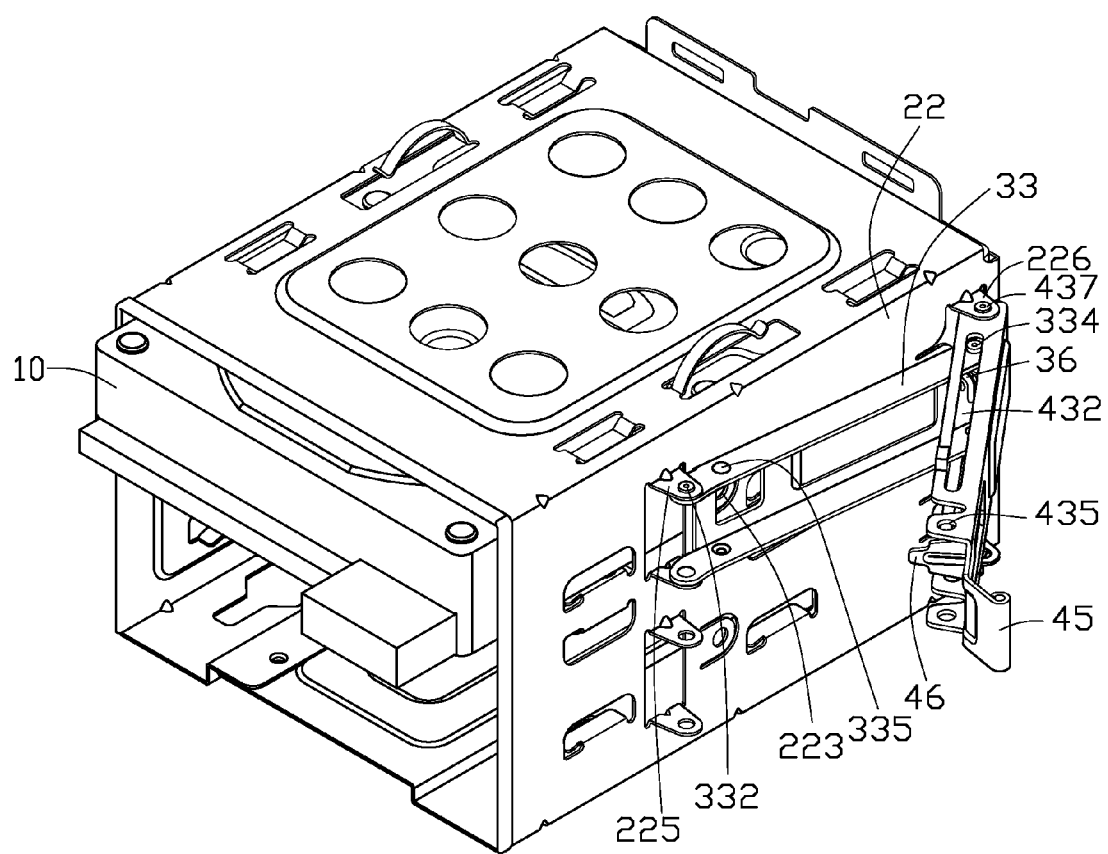
FIG. 3 is an assembled view of FIG. 1, but showing the first locking member and the second locking member in unlocked states.
Figure 4:
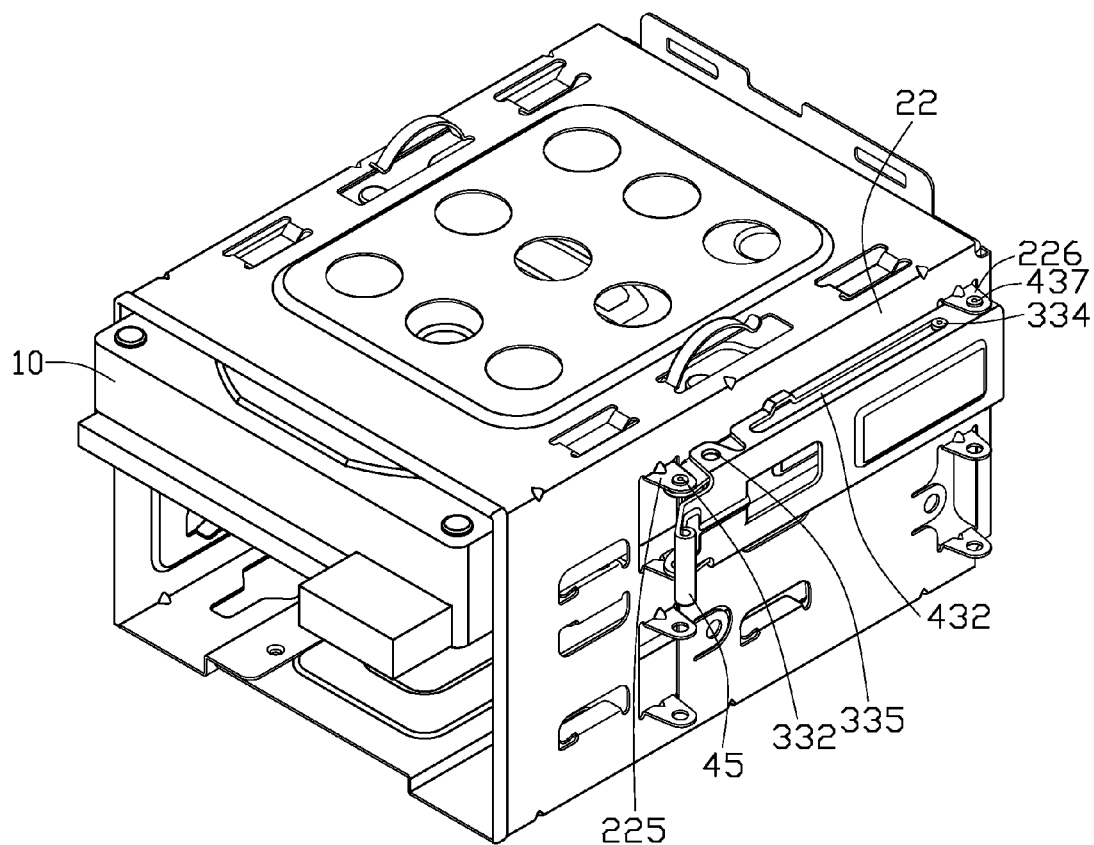
FIG. 4 is an assembled view of FIG. 1, showing the first locking member and the second locking member in locked states.

Referring also to FIGS. 3 and 4, in assembly, the first locking member 30 is pivotably mounted to the first side wall 22 of the bracket 20 via the first posts 332 thereof pivotably received in the corresponding first mounting holes 226 of the first side wall 22. The sliding portions 334 of the first locking member 30 are slidably received in the corresponding sliding slots 432 of the second locking member 40 through the corresponding entries. The second locking member 40 is pivotably mounted to the first side wall 22 of the bracket 20 via the second posts 437 thereof being pivotably received in the corresponding second mounting holes 228 of the first side wall 22.

In mounting the data storage device 10, the data storage device 10 is slidably placed on the limiting tabs 221 of the bracket 20. The first and second locking holes 133, 131 of the data storage device 10 respectively align with the first and second through-holes 224, 223 of the first side wall 22 of the bracket 20. The second locking member 40 is pivoted toward the first side wall 22. The sliding portions 334 of the first locking member 30 slide in the corresponding sliding slots 432 of the second locking member 40. The second locking portion 46 of the second locking member 40 is inserted through the opening 315 of the first locking member 30. The first locking portion 36 of the first locking member 30 is inserted through the first through-hole 224 to engage in the first locking hole 133 of the data storage device 10. The second locking member 40 is pivoted further until the second locking portion 46 thereof is inserted through the second through-hole 223 of the first side wall 22 of the bracket 20 to engage in the second locking hole 131 of the data storage device 10. Then, edges of the locating holes 435 of the second locking member 40 catch the corresponding protrusions 335 of the first locking member 30. Thus, the data storage device 10 is mounted to the bracket 20.

In disassembling the data storage device 10, the operating portion 45 of the second locking member 40 is pulled to make the protrusions 335 of the first locking member 30 disengage from the corresponding locating holes 435 of the second locking member 40. The second locking member 40 is pivoted away from the first side wall 22 of the bracket 20. The sliding portions 334 of the first locking member 30 slide in the corresponding sliding slots 432 of the second locking member 40 to cause the first locking member 30 to pivot away from the first side wall 22 in a direction counter to the pivoting direction of the second locking member 40. The second locking portion 46 of the second locking member 40 is disengaged from the second locking hole 131 of the data storage device 10. The second locking member 40 is pivoted further until the first locking portion 36 of the first locking member 30 is disengaged from the first locking hole 133 of the data storage device 10. Thus, the data storage device 10 is easily removed from the bracket 20.

Figure 5:
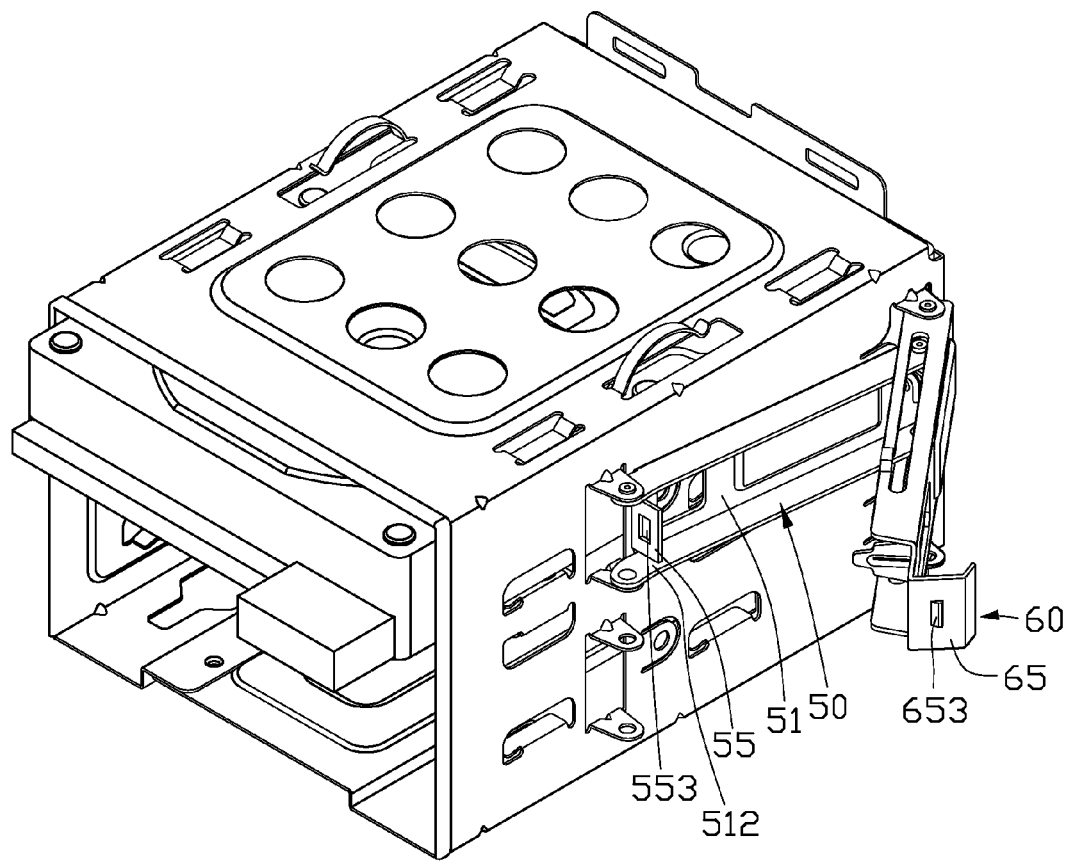
FIG. 5 is an assembled view of a mounting apparatus in accordance with an alternative preferred embodiment of the present invention, together with a data storage device, the mounting apparatus includes a first locking member, and a second locking member, and the first locking member and the second locking member shown in unlocked states.

FIG. 5 shows a mounting apparatus in accordance with an alternative embodiment of the invention. The mounting apparatus of this embodiment is similar to the mounting apparatus of the above-mentioned embodiment. Differences of the mounting apparatus of this embodiment from the above-mentioned embodiment are that the second locking member 60 is secured to the first locking member 50 via a protrusion 653 protruding from the operating portion 65 of the second locking member 60 engaging in a securing hole 553 that is defined in a securing tab 55 perpendicularly extending out from the main part 51 of the first locking member 50.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A mounting apparatus for mounting a data storage device that defines a locking hole in a sidewall thereof, the mounting apparatus comprising:
   a bracket configured for holding the data storage device comprising a side wall, the side wall defining a through-hole therein;
   a first locking member pivotably mounted to the side wall of the bracket, a locking portion protruding from the first locking member for being inserted through the through-hole of the bracket to engage in the locking hole of the data storage device; and
   a second locking member pivotably mounted to the side wall of the bracket, and releasably mounted to the first locking member which allows the second locking member to be pivoted to urge the first locking member to pivot to thereby disengage the locking portion from the locking hole of the data storage device.

2. The mounting apparatus as claimed in claim 1, wherein the first locking member comprises a main plate, the locking portion is bent from an end of the main plate, an opposite end of the first locking member is pivotably mounted to the first side wall of the bracket.

3. The mounting apparatus as claimed in claim 2, wherein the first locking member further comprises two side plate respectively perpendicularly extending from a top and a bottom side of the main plate thereof, a first post protrudes from an end of each of the side plates, two first mounting tabs are bent from the first side wall of the bracket, each of the first mounting tabs defines a mounting hole for pivotably receiving a corresponding first post.

4. The mounting apparatus as claimed in claim 3, wherein the second locking member comprises a main board, and two side boards respectively perpendicularly extending from a top and a bottom side of the main board, a second post protrudes from an end of each of the side boards, two second mounting tabs are bent from the first side wall of the bracket, each of the second mounting tabs defines a second mounting hole for pivotably receiving the corresponding second post.

5. The mounting apparatus as claimed in claim 2, wherein the first locking member further comprises a sliding portion protruding therefrom adjacent the locking portion, the second locking member defines a sliding slot therein, for slidably receiving the sliding portion of the first locking member.

6. The mounting apparatus as claimed in claim 5, wherein a side plate is perpendicularly bent from a top or a bottom side of the main plate of the first locking member, the sliding portion protrudes from an end of the side plate.

7. The mounting apparatus as claimed in claim 5, wherein the second locking member comprises a main board, and a side board perpendicularly extending from a top or a bottom side of the main board, the sliding slot is defined in the side board.

8. The mounting apparatus as claimed in claim 1, wherein the first locking member comprises a main plate, and a side plate extending from the main plate, a protrusion protrudes from the side plate adjacent the end that is pivotably mounted to the first side wall of the bracket, of the first locking member, the second locking comprises a main board, and a side board extending from the main board, a locating hole is defined in the main board for receiving the protrusion.

9. A mounting apparatus for mounting a data storage device that defines a locking hole in a sidewall thereof, the mounting apparatus comprising:

a bracket configured for holding the data storage device comprising a side wall, the side wall defining a through-hole therein;

a first locking member pivotably mounted to the side wall of the bracket, the first locking member defining an opening therein; and a second locking member pivotably mounted to the side wall of the bracket, and movably mounted to the first locking member, a locking portion protruding from the second locking member for being inserted through the opening of the first locking member and the through-hole of the bracket to engage in the locking hole of the data storage device.

10. The mounting apparatus as claimed in claim 9, wherein the first locking member comprises a main plate, the opening is defined in an end of the first locking member, the end of the first locking member is pivotably mounted to the first side wall of the bracket.

11. The mounting apparatus as claimed in claim 10, wherein the second locking member comprises a main board, the locking portion protrudes from an end of the main board, an opposite end of the main board is pivotably mounted to the first side wall of the bracket.

12. The mounting apparatus as claimed in claim 10, wherein the second locking member comprises a main board, and two side boards respectively perpendicularly extending from a top and a bottom side of the main board, a second post protrudes from an end of each of the side boards, two second mounting tabs are bent from the first side wall of the bracket, each of the second mounting tabs defines a second mounting hole for pivotably receiving the corresponding second post.

13. The mounting apparatus as claimed in claim 10, wherein the first locking member further comprises two side plate respectively perpendicularly extending from a top and a bottom side of the main plate thereof, a first post protrudes from an end of each of the side plates, two first mounting tabs are bent from the first side wall of the bracket, each of the first mounting tabs defines a mounting hole for pivotably receiving a corresponding first post.

14. The mounting apparatus as claimed in claim 10, wherein the first locking member further comprises a sliding portion protruding from an opposite end thereof, the second locking member defines a sliding slot therein, for slidably receiving the sliding portion of the first locking member.

15. The mounting apparatus as claimed in claim 14, wherein a side plate is perpendicularly bent from a top or a bottom side of the main plate of the first locking member, the sliding portion protrudes from an end of the side plate.

16. The mounting apparatus as claimed in claim 14, wherein the second locking member comprises a main board, and a side board perpendicularly extending from a top or a bottom side of the main board, the sliding slot is defined in the side board.

17. The mounting apparatus as claimed in claim 9, wherein the first locking member comprises a main plate, a locating hole is defined in the side plate adjacent the opening, the second locking comprises a main board, a protrusion adjacent the locking portion protrudes from the main board for receiving the protrusion.

18. A mounting apparatus for mounting a data storage device that defines a pair of locking holes, the mounting apparatus comprising:

a bracket configured for accommodating the data storage device therein, the bracket comprising a side wall defining a pair of through-holes;

a first locking member having opposing two end portions one of which is pivotably mounted to the side wall of the bracket, a first locking portion protruding from the other end portion of the first locking member for being inserted through one of the through-holes of the bracket to engage in a corresponding locking hole of the data storage device; and a second locking member having two opposing end sections one of which is pivotably mounted to the side wall of the bracket, a second locking portion protruding from the other end section of the second locking member for being inserted through the other through-hole of the bracket to engage in the other locking hole of the data storage device, wherein the other end portion of the first locking member is slidably attached to the second locking member and the other end section of the second locking member is releasably attached with respect to the one end portion of the first locking member which allows the second locking member to be pivoted to urge the first locking member to pivot to thereby disengage the first and second locking portions from the locking holes of the data storage device.

19. The mounting apparatus as claimed in claim 18, wherein pivoting directions of the first and second locking members are counter to each other.

20. The mounting apparatus as claimed in claim 19, wherein the second locking member is located at outside of the first locking member and the first locking member defines an opening for extending through of the second locking portion.

* * * * *